(12) United States Patent
Das et al.

(10) Patent No.: US 10,764,366 B2
(45) Date of Patent: Sep. 1, 2020

(54) SYSTEM AND METHOD FOR STORING DATA IN DATA STORAGE UNIT OF VIRTUAL STORAGE AREA NETWORK

(71) Applicant: Wipro Limited, Bangalore (IN)

(72) Inventors: Rishav Das, Howrah (IN); Karanjit Singh, Tarn-Taran (IN)

(73) Assignee: Wipro Limited, Bangalore (IN)

( * ) Notice: Subject to any disclaimer, the term of this patent is extended or adjusted under 35 U.S.C. 154(b) by 240 days.

(21) Appl. No.: 15/446,534

(22) Filed: Mar. 1, 2017

(65) Prior Publication Data

US 2018/0191826 A1 Jul. 5, 2018

(30) Foreign Application Priority Data

Jan. 3, 2017 (IN) .............................. 201741000193

(51) Int. Cl.
*H04L 29/08* (2006.01)
*G06F 3/06* (2006.01)
*H04L 12/26* (2006.01)

(52) U.S. Cl.
CPC ........ *H04L 67/1097* (2013.01); *G06F 3/0604* (2013.01); *G06F 3/067* (2013.01);
(Continued)

(58) Field of Classification Search
CPC ................. G06F 3/0631; G06F 3/0607; G06F 2212/214; G06F 2212/222; G06F 3/067; G06F 2212/263; G06F 3/0604; G06F 3/0629; G06F 3/0644; G06F 3/0608; G06F 3/0665; G06F 11/1435; G06F 12/0246; G06F 2212/152; G06F 2212/253; G06F 2212/7201; G06F 2212/7204;
(Continued)

(56) References Cited

U.S. PATENT DOCUMENTS

| | | | | |
|---|---|---|---|---|
| 5,463,381 A | * | 10/1995 | Ryu | ......................... G06F 13/14 340/825 |
| 6,092,170 A | * | 7/2000 | Kori | ..................... G06F 12/1081 710/26 |

(Continued)

OTHER PUBLICATIONS

Cormac Hogan; VSAN and Storage Controllers; VMWare, VSphere Blog; Sep. 26, 2013; pp. 1-6 (Year: 2013).*

(Continued)

*Primary Examiner* — Tonia L Dollinger
*Assistant Examiner* — Linh T. Nguyen
(74) *Attorney, Agent, or Firm* — Finnegan, Henderson, Farabow, Garrett & Dunner, LLP (57) ABSTRACT

The present disclosure discloses a method and a system for storing data in a data storage system of a Virtual Storage Area Network (VSAN). The method comprises receiving, by a server management system, a request message for storing data, from an array controller of a first node among a plurality of nodes of a Virtual Storage Area Network (VSAN) cluster, where each of the plurality of nodes comprises a pair of array controllers and a data storage unit, identifying a second node from the plurality of nodes, for storing the data in a data storage unit of the second node and routing the data to an array controller of the second node, for storing the data in the data storage unit, for effectively utilizing the data storage unit of the VSAN network.

12 Claims, 6 Drawing Sheets

(52) U.S. Cl.
CPC .......... *G06F 3/0631* (2013.01); *G06F 3/0635* (2013.01); *H04L 43/16* (2013.01)

(58) Field of Classification Search
CPC .......... G06F 2212/7211; G06F 3/0658; G06F 3/0685; G06F 16/68; G06F 3/0689; G06F 2206/1012; G06F 16/27; G06F 3/0647; G06F 3/0683; G06F 9/5083; G06F 12/02; G06F 2201/81; G06F 3/064; G06F 11/3409; G06F 11/3433; G06F 2209/5019; G06F 2212/283; H04L 43/16; H04L 67/1097
USPC .......... 170/170, 154, 172; 709/212, 216, 219
See application file for complete search history.

(56) References Cited

U.S. PATENT DOCUMENTS

| | | | |
|---|---|---|---|
| 9,710,165 B1* | 7/2017 | Lherault et al. | G06F 3/06 |
| 2002/0023161 A1* | 2/2002 | Ito | H04L 12/28 |
| | | | 709/229 |
| 2002/0114326 A1* | 8/2002 | Mahalingaiah | H04L 12/46 |
| | | | 370/389 |
| 2002/0156887 A1* | 10/2002 | Hashimoto | G06F 3/0613 |
| | | | 709/224 |
| 2006/0129779 A1* | 6/2006 | Cannon | G06F 3/0605 |
| | | | 711/170 |
| 2006/0277383 A1* | 12/2006 | Hayden | H04L 67/1097 |
| | | | 711/170 |
| 2007/0260822 A1* | 11/2007 | Adams | H04M 1/7253 |
| | | | 711/147 |
| 2012/0079096 A1* | 3/2012 | Cowan | G06F 11/3006 |
| | | | 709/224 |
| 2013/0086351 A1 | 4/2013 | Coronado et al. | |
| 2015/0074222 A1* | 3/2015 | Liang | G06F 3/0605 |
| 2015/0117458 A1* | 4/2015 | Gurkan | H04L 49/25 |
| | | | 370/392 |
| 2016/0077966 A1* | 3/2016 | Stabrawa | G06F 3/0604 |
| | | | 711/172 |
| 2016/0092121 A1* | 3/2016 | Nazari | G06F 3/0616 |
| | | | 711/103 |
| 2016/0337426 A1* | 11/2016 | Shribman | H04L 65/4084 |
| 2016/0364484 A1* | 12/2016 | Dong | G06F 16/951 |
| 2017/0109184 A1* | 4/2017 | Ramani | G06F 9/45558 |
| 2017/0109247 A1* | 4/2017 | Nakajima | G06F 11/20 |
| 2017/0315752 A1* | 11/2017 | Colgrove | G06F 3/0607 |
| 2017/0324813 A1* | 11/2017 | Jain | H04L 41/5009 |

OTHER PUBLICATIONS

White Paper, "High Availability, Data Protection and Data Integrity in the XtremIO Architecture", 2015, *EMC²*, pp. 1-28.

Extended European Search Report issued in the European Patent Office in counterpart European Application No. 17163901.6, dated Oct. 25, 2017, 9 pages.

* cited by examiner

SYSTEM AND METHOD FOR STORING DATA IN DATA STORAGE UNIT OF VIRTUAL STORAGE AREA NETWORK

TECHNICAL FIELD

The present disclosure relates to data storage in a Virtual Storage Area Network (VSAN). More particularly, but not exclusively, the present disclosure relates to effective utilization of data storage units for storing data in the VSAN.

BACKGROUND

A storage area network (SAN) is a dedicated high-speed network for interconnecting and presenting a shared pool of storage devices to multiple servers. SAN is primarily used to enhance performance of the storage devices as they appear as a single locally attached device to the servers, where the servers are centrally managed. Virtual Storage Area Network (VSAN) is a logical partition in the SAN. The VSAN allows data traffic of the servers to be isolated within specific portions of SAN so that system of storage devices is scaled out and is easy to configure. The main objective of the VSAN is the easy management of subscribers which can be added or relocated without the need for changing the physical layout of storage. Another objective of the VSAN is to provide data redundancy which minimizes the risk of data loss.

A conventional VSAN storage array includes a brick as a basic building block. The brick of the VSAN architecture comprises two storage controllers for receiving Input/Output (I/O) request from host machines connected to the bricks. The brick further comprises a Disk Array Enclosure (DAE) for holding multiple Solid State Drives (SSD) for storing data, and backup units. Each storage controller has multi-core Central Processing Units (CPUs) for processing I/O tasks. In the conventional architecture of VSAN, the bricks may be clustered together to increase performance and capacity of the system. A cluster in VSAN may include two or more bricks. When storage space in a brick of the cluster is utilized up to a threshold, an alert is sent to a user to scale out the system by including additional bricks in the system. For example, the threshold may be 90% of total storage available in the brick. Thus, the user has to manually instruct the system for including additional bricks in the system. Also, inclusion of additional bricks in the system may cost substantial amount of money. Additionally, if the threshold is reached, a new I/O request has to wait in a process queue to be processed, hence increasing latency to process the request.

Furthermore, the existing VSAN architecture only alerts the user, and does not provide automatic inclusion of bricks to the VSAN network, i.e. in the existing architecture, there does not exist a mechanism to route the data to different a secondary data storage unit when primary data storage unit is overloaded. Therefore, the bricks of the VSAN network is not fully utilized. Also, in the conventional VSAN architecture, an I/O request cannot be passed to different bricks of the VSAN. Thus, processing load of a brick is not efficiently managed.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure presents a method for storing data in a data storage unit of a Virtual Storage Area Network (VSAN). The method comprises receiving, by a server management system, a request message for storing data, from an array controller of a first node among a plurality of nodes of a Virtual Storage Area Network (VSAN) cluster, where each of the plurality of nodes comprises a pair of array controllers and a data storage unit, identifying a second node from the plurality of nodes, for storing the data in a data storage unit of the second node and routing the data to an array controller of the second node, for storing the data in the data storage unit, for effectively utilizing the data storage unit of the VSAN network.

In one embodiment, the present disclosure presents a system for storing data in a data storage unit of a Virtual Storage Area Network (VSAN). The system comprises a processor and a memory. The processor is configured to receive a request message for storing data, from an array controller of a first node among a plurality of nodes of a Virtual Storage Area Network (VSAN) cluster, wherein each of the plurality of nodes comprises a pair of array controllers and a data storage unit, identify a second node from the plurality of nodes, for storing the data in a data storage unit of the second node and route the data to an array controller of the second node, for storing the data in the data storage unit, for effectively utilizing the data storage unit of the VSAN network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In an embodiment, the present disclosure discloses a server management system for storing data in a data storage unit of a Virtual Storage Area Network (VSAN). The server management system receives a request message from a first node of a VSAN, for storing data, when a data storage unit of the first node cannot accommodate the data. Then, the server management system identifies a second node among plurality of nodes of the VSAN for storing the data in data storage unit of the second node. Thus, the present disclosure provides a system for utilizing data storage unit of the VSAN.

Figure 1:
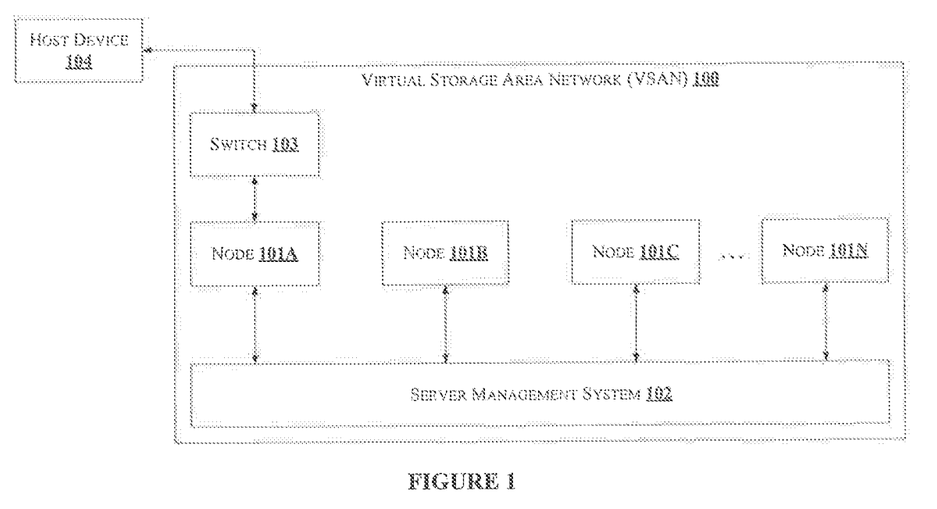
FIG. 1 shows a VSAN architecture for storing data in a data storage unit in accordance with some embodiments of the present disclosure.

FIG. 1 shows a VSAN 100 architecture for storing data in a data storage unit in accordance with some embodiments of the present disclosure. The VSAN 100 comprises node 101A, node 101B, node 101C, . . . , node 101N, a server management system 102 and a switch 103. The VSAN 100 is connected to a host device 104. For illustration, only one user device 104 is shown in FIG. 1. However, plurality of user devices can be connected to a single node. The node 101A, node 101B, node 101c, . . . , node 101N may be collectively represented as plurality of nodes 101. The term plurality of nodes 101 is used throughout this disclosure to represent the collective representation of node 101A, node 101B, node 101C, . . . , node 101N. Each of the plurality of nodes 101 is connected to the server management system 102, either by wired interface or wireless interface. In an embodiment, each of the plurality of nodes 101 may be a server. Further, each of the plurality of nodes 101 may be connected to a host device 104. For illustration, let us consider that node 101A is connected to the host device 104, through the switch 103. The switch 103 receives one or more Input/Output (I/O) request messages from the host device 104. The one or more I/O request messages may comprise instructions for storing data, along with data to be stored. The one or more I/O request message may further comprise address for storing the data. Then, the switch 103 forwards the one or more I/O request messages to corresponding node among the plurality of nodes 101 based on the address. For illustration purpose, the switch 103 is connected to the node 101A in FIG. 1. However, in a network, the switch 103 will be connected to one or more nodes. For convenience, let the node 101A be represented as first node 101A. The first node 101A receives the one or more I/O request messages from the switch 103 for storing the data. The first node 101A forwards the one or more I/O request messages to the server management system 102 for storing the data in a second node among the plurality of nodes 101, when the first node 101A cannot accommodate to store the data. Here, the first node 101A forwards the one or more I/O request messages to the server management system 102 when data availability in a data storage unit (not shown in FIG. 1) associated with the first node 101A is less than a predefined threshold memory. The server management system 102 identifies a second node among the plurality of nodes 101 and forwards the one or more I/O request messages to the second node for storing the data in a data storage unit associated with the second node. For illustration, let us consider that the second node be represented by node 101B.

In an embodiment, the host device 104 may be a Personal Digital Assistant (PDA), a laptop, a Personal Computer (PC), a smartphone or any other computing unit.

Figure 2:
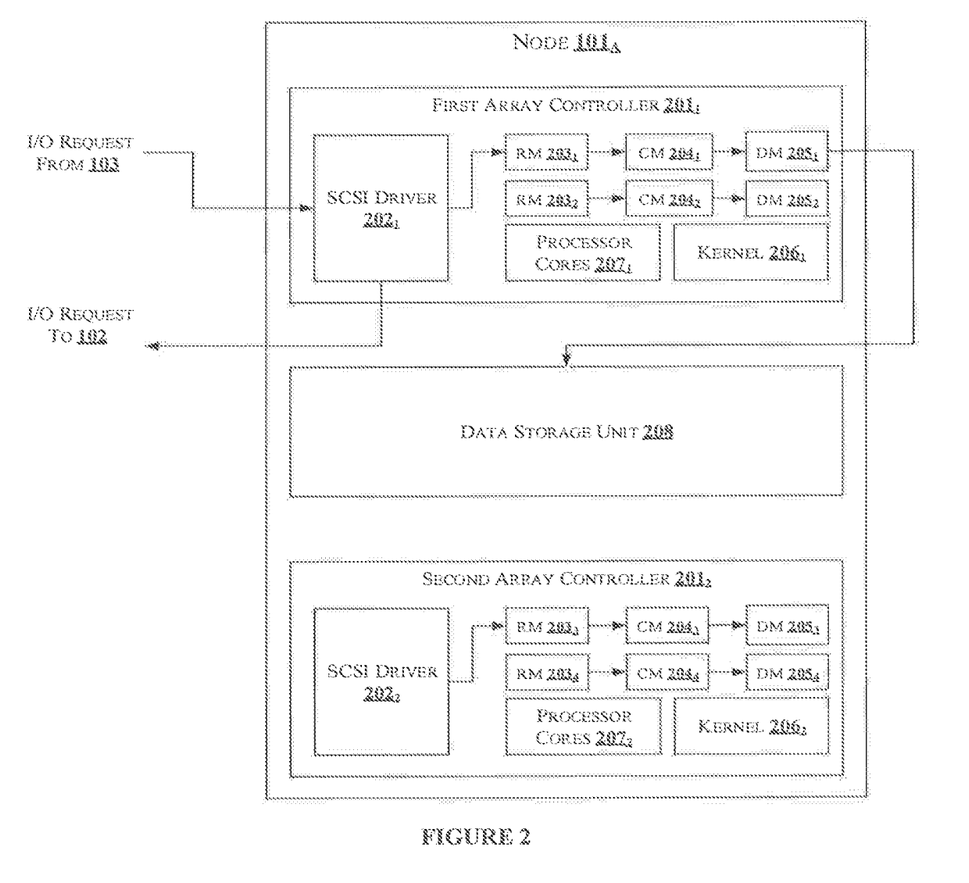
FIG. 2 shows an exemplary block diagram of a node of a VSAN for storing data in a data storage unit in accordance with some embodiments of the present disclosure.

FIG. 2 shows an exemplary block diagram of a node of a VSAN 100 for storing data in a data storage unit in accordance with some embodiments of the present disclosure. For illustration FIG. 2, let us consider the first node $101_A$. However, any node among the plurality of nodes 101 can be considered. The first node 101A comprises a first array controller $201_1$, a second array controller $201_2$, and a data storage unit 208. Further, the first array controller $201_1$ comprises a Small Computer System interface (SCSI) driver $202_1$, a routing module $203_1$, a routing module $203_2$, a control module $204_1$, a control module $204_2$, a data module $205_1$, a data module $205_2$, a kernel $206_1$ and processor cores $207_1$. The second array controller $201_2$ comprises a Small Computer System Interface (SCSI) driver $202_2$, a routing module $203_3$, a routing module $203_4$, a control module $204_3$, a control module $204_4$, a data module $205_3$, a data module $205_4$, a kernel $206_2$ and processor cores $207_2$.

In an embodiment, for processing an I/O request, either the first array controller $201_1$ or the second array controller $201_2$, takes control of the data storage unit 208. Either of the first array controller $201_1$ or the second array controller $201_2$ help in storing the data in the data storage unit 208. For illustration, let us consider that the first array controller $201_1$ receives the I/O request from the host device 104 through the switch 103, for storing the data in the data storage unit 208. The SCSI driver $202_1$ facilitates data communication, within the first array controller $201_1$, with the switch 103 and with the server management system 102. The SCSI driver $202_1$ receives the one or more I/O request messages from the switch 103. Further, one of, the routing modules $203_1$ and the routing module $203_2$ receives the one or more I/O request messages from the SCSI driver $202_1$. Let us consider that the routing module $203_1$ receives the one or more request messages from the SCSI driver $202_1$. The routing module $203_1$ then routes the data and the address present in the one or more I/O request messages to corresponding control module $204_1$. The control module $204_1$ converts the address to an internal address. Then, the control module $204_1$ forwards the data to corresponding data module $205_1$ based on the internal address. The data module $205_1$ comprises a mapping of the internal address with corresponding physical address of the data storage unit 208 where the data is intended to be stored. The data module $205_1$ stores the data in the physical address of the data storage unit 208 based on the mapping.

In an embodiment, the data storage unit 208 of each of the plurality of nodes 101 is associated with a corresponding predefined threshold memory. The predefined threshold memory is set on total memory of respective data storage unit 208.

In an embodiment, the data storage unit 208 comprises a counter. The value of the counter increases based on amount of data stored in the data storage unit 208. The kernel $206_1$ monitors the data storage unit 208 for available memory based on the predefined threshold. The kernel $206_1$ configures the SCSI driver $202_1$ to forward the one or more I/O requests to the server management system 102 when the available memory in the data storage unit 208 is less than the predefined threshold memory. Also, the kernel $206_1$ configures the SCSI driver $202_1$ to transmit available memory in the data storage unit 208 to the server management system 102 at predefined intervals of time.

Figure 3:
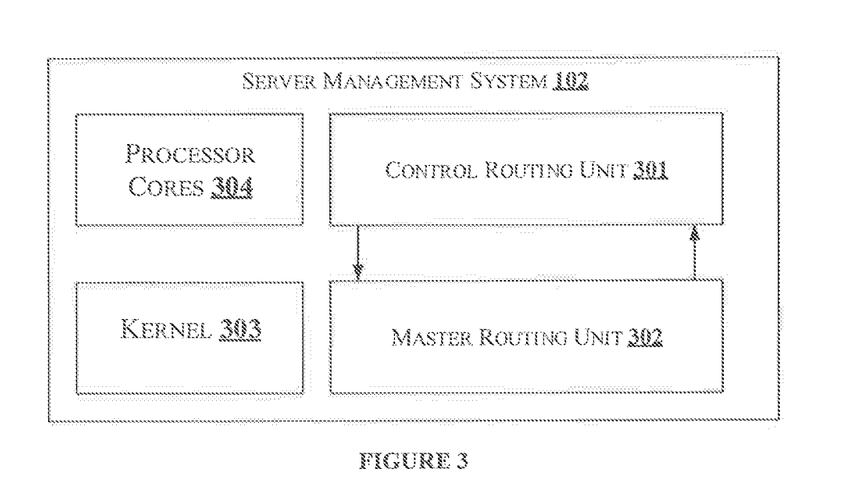
FIG. 3 shows an exemplary block diagram of a server management system of a VSAN for storing data in a data storage unit in accordance with some embodiments of the present disclosure.

FIG. 3 shows an exemplary block diagram of a server management system 102 of a VSAN for storing data in a data storage unit in accordance with some embodiments of the present disclosure. The server management system 102 comprises a Control Routing Unit (CRU) 301 and a Master Routing Unit (MRU) 302. The server management system 102 further comprises a kernel 303 and processor cores 304. The CRU 301 receives the one or more I/O request messages from the SCSI driver $202_1$. The CRU 301 acts as a temporary storage unit. The CRU 301 stores the data present in the one or more I/O request messages temporarily. Then, the kernel 303 configures the MRU 302 to identify a second node 101B among the plurality of nodes 101 for storing the data. Upon identifying the second node 101B, the MRU 302 maps address of the first node 101A with address of the second node 101B. Further, the MRU 302 provides instructions to the CRU 301 for transmitting the data to the address of the second node 101B. The CRU 301 transmits the data to the second node 101B for storing the data in the second node 101B.

Figure 4:
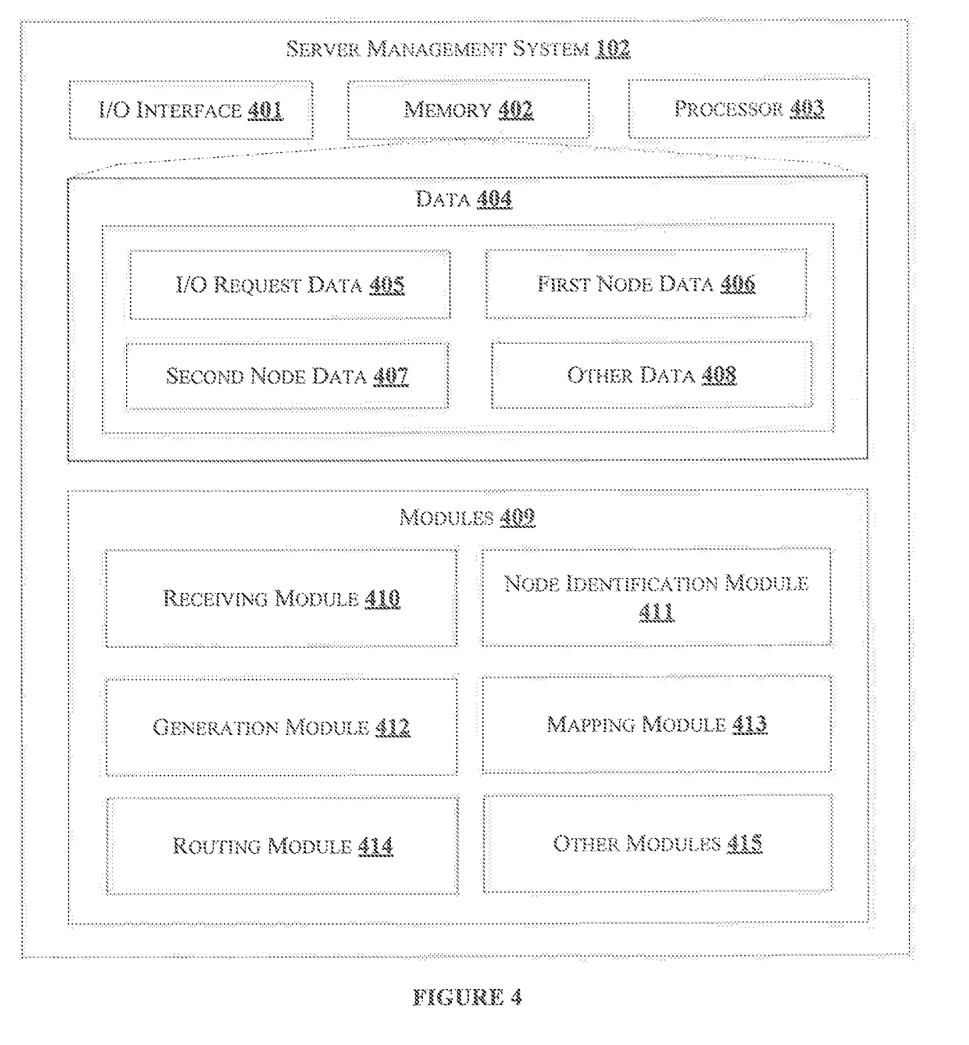
FIG. 4 shows internal architecture of a server management system for storing data in a data storage unit in accordance with some embodiments of the present disclosure.

FIG. 4 illustrates internal architecture of the server management system 102 in accordance with some embodiments of the present disclosure. The server management system 102 may include at least one central processing unit ("CPU" or "processor") 403 and a memory 402 storing instructions executable by the at least one processor 403. The processor 403 may comprise at least one data processor for executing program components for executing user or system-generated requests. The memory 402 is communicatively coupled to the processor 403. The server management system 102 further comprises an Input/Output (I/O) interface 401. The I/O interface 401 is coupled with the processor 403 through which an input signal or/and an output signal is communicated.

In an embodiment, data 404 may be stored within the memory 402. The data 404 may include, for example, I/O request data 405, first node data 406, second node data 407 and other data 408.

In an embodiment, I/O request data 404 may include data to be stored and a request message for storing the data. In an embodiment, the first node data 406 and the second node data 407 may include I/O request message type, available memory in data storage unit 208 of the first node 101A and the second node 101B. In an embodiment, the I/O request message type may include a read request, a write request, request for editing, etc.

In an embodiment, the data 404 in the memory 402 is processed by modules 409 of the server management system 102. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules 409 when configured with the functionality defined in the present disclosure will result in a novel hardware.

In one implementation, the modules 409 may include, for example, receiving module 410, node identification module 411, generation module 412, mapping module 413, routing module 414 and other modules 415. It will be appreciated that such aforementioned modules 409 may be represented as a single module or a combination of different modules.

In an embodiment, the receiving module 410 receives the one or more I/O request messages from the SCSI driver $202_1$ of the first node when available memory in the data storage unit 208 of the first node is less than the predefined threshold memory. Let the data storage unit 208 of the first node 101A be represented as first data storage unit for illustration of this embodiment. The receiving module 410 may store the one or more I/O request messages in the CRU 301. The receiving module 410 may communicate with the SCSI driver $202_1$ through wired interface or wireless interface.

In an embodiment, the node identification module 411 identifies a second node 101B among the plurality of nodes 101 for storing the data. Here, the second node is identified based on size of the data and available memory in the data storage unit 208 of the second node 101B. Let the data storage unit 208 of the second node be represented as second data storage unit for illustration of this embodiment. In an embodiment, the node identification module 411 receives data regarding available memory in data storage unit 208 from each of the plurality of nodes 101. In an embodiment, the node identification module 411 receives the data regarding available memory in data storage unit 208 from each of the plurality of nodes 101 at predefined intervals of time. Further, the node identification module 411 identifies a second node 101B among the plurality of nodes 101 such that available memory in the second data storage unit is greater than the corresponding predefined threshold memory. Further, the second node 101B is identified when the size of the data can be accommodated in the available memory in the second data storage unit 208.

In an embodiment, the generation module 412 generates an ID and address for the first node 101A and the second node 101B, when the server management system 102 receives the one or more I/O request messages from the first node 101A. The generation module 412 generates the ID based on cluster of the first node 101A and second node 101B, the array controller 201 used for processing the one or more I/O request messages and the routing module 203 of the array controller 201. Further, the generation module 412 generates an address for the first node 101A and the second node 101B. The address for the first node 101A is generated based on the I/O request message type and ID of the first node 101A. Likewise, the generation module generates address for the second node 101B based on the I/O request message type and ID of the second node 101B. In an embodiment, the ID and address for each of the plurality of nodes 101 is unique. In an embodiment, the mapping module 413 forms a part of the MRU 302.

In an embodiment, a cluster indicates a group of nodes. In an embodiment, the first node 101A and the second node 101B may be a part of a same cluster or may be a part of different clusters. The VSAN 100 comprises plurality of clusters, each cluster comprising plurality of nodes 101.

In an embodiment, the mapping module 413 receives the address of the first node 101A and the second node 101B and maps the address of the first node 101A with the address of the second node 101B. The mapping indicates a source node and a corresponding destination node. Thus, the mapping module 413 generates a map of all source nodes requesting the server management system 102 for storing the data, and corresponding destination nodes. In an embodiment, the mapping module 413 forms a part of the MRU 302.

In an embodiment, the routing module 414 routes the data present in the CRU 301 to the second node 101B based on the map generated by the mapping module 413. Here, the routing module 414 routes the data to SCSI driver $202_B$ of the second node 101B for storing the data in the data storage unit $208_B$.

In an embodiment, the other modules 415 may include notification module, node monitoring module, etc. In an embodiment, the notification module may notify administrator of the VSAN 100 regarding available memory of data storage unit 208 of each of the plurality of nodes 101. In an embodiment, the server management system 102 may include a monitoring unit for monitoring available memory in the data storage unit 208 of each of the plurality of nodes 101.

Figure 5:
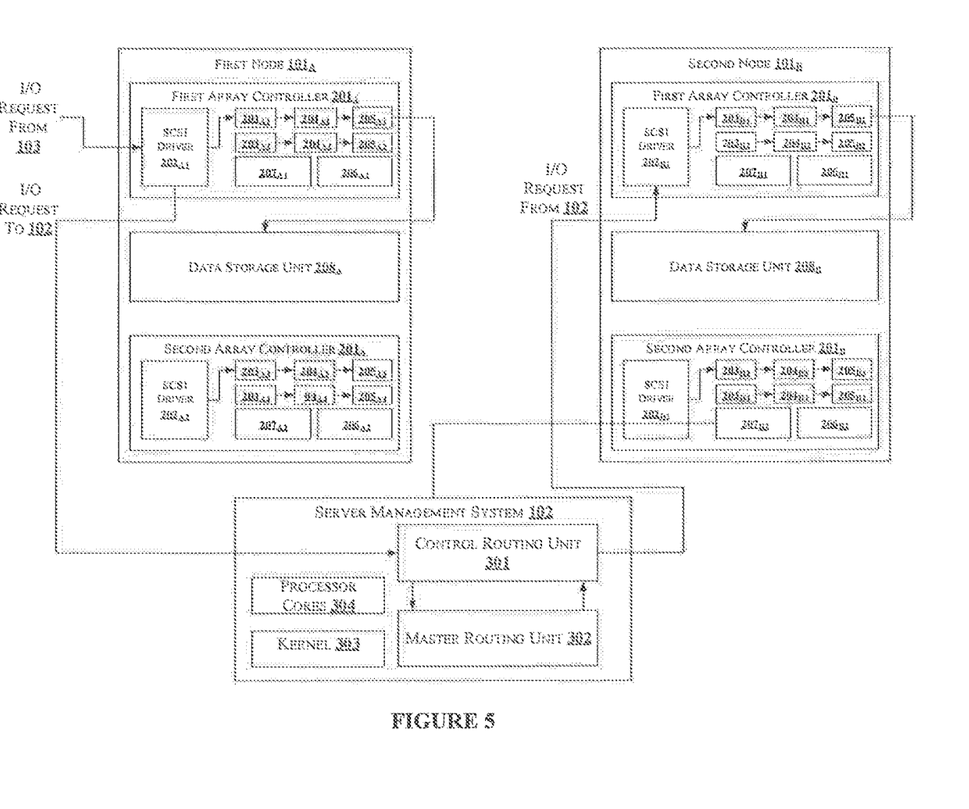
FIG. 5 illustrates management of data storage unit for storing data in accordance with some embodiments of the present disclosure.

FIG. 5 illustrates management of data storage unit for storing data in accordance with some embodiments of the present disclosure. FIG. 5 illustrates an example where the data to be stored in the first node 101A is stored in the second node 101B using the server management system 102. Consider first array controller $201_A$ receives the one or more I/O request messages from the switch 103. Particularly, the SCSI driver $202_{A1}$ receives the one or more I/O request messages. Further, the SCSI driver $202_{A1}$ forwards the one or more I/O request messages to the routing module $203_{A1}$. Then, the routing module $203_{A1}$ transmits the data and address present in the one or more I/O request messages to the corresponding control module $204_{A1}$. In turn, the control module $204_{A1}$ routes the data to be stored in the data storage unit $208_A$ to corresponding data module $205_{A1}$. Let the predefined threshold memory for available memory be 10% of total memory of the data storage unit $208_A$. Consider a scenario where the available memory of the data storage unit $208_A$ is less than the predefined threshold memory. Here, the kernel $206_{A1}$ detects that the available memory in the data storage unit $208_A$ is less than the predefined threshold memory and refrains from storing the data in the data storage unit $208_A$. Therefore, the kernel $206_{A1}$ configures the SCSI driver $202_{A1}$ to forward the one or more I/O request messages to the sever management system 102 for storing the data. The receiving module 410 of the server management system 102 receives the one or more I/O request messages from the SCSI driver $202_{A1}$ from the first node 101A. Further, the receiving module 410 stores the data in the CRU 301.

Consider that the node identification module 411 may have access to the data regarding available memory in data storage unit 208 of each of the plurality of nodes 101. Now, the node identification module 411 traverses each of the plurality of nodes 101 and identifies the second node 101B based on the predefined threshold memory and the size of data. Let us consider that the data storage unit $208_B$ has available memory greater than the corresponding predefined threshold memory. Further, the generation module 413 generates ID and address for the first node 101A and the second node 101B. Table 1 shows an example of ID and address for the first node 101A and the second node 101B and the mapping of the address of the first node 101A with the address of the second node 101B.

TABLE 1

| Source ID | Source Address | Destination ID | Destination Address |
|---|---|---|---|
| CL-2-AC-1-RM-1 = 6 | #4067-AC-1-6 | CL-1-AC-1-RM-1 = 1 | #4067-AC-1-1 |

From Table 1, the source ID indicates that the first node is from cluster 2, the one or more I/O request messages are processed by the first array controller $201_{A1}$ and the routing module $203_{A1}$ has received the one or more I/O request messages. Further, the source address indicates the one or more I/O request messages type, the array controller 201 used to process the one or more I/O request messages. Likewise, the ID and address of the second node 101B indicates that the second node 101B lies in cluster 1. Further, the array controller $201_B$ and the routing module $203_{B1}$ should be used for storing the data in the data storage unit $208_B$. Then, the routing module 414 routes the data stored in the CRU 301 to the second node 101B based on the mapping. The SCSI driver $202_{B1}$ of the second node 101B receives the data and forwards the data to the routing module $203_{B1}$ of the first array controller $201_B$. The routing module $203_{B1}$ routes the data to corresponding control module $204_{B1}$ and in turn the control module $204_{B1}$ routes the data to corresponding data module $205_{B1}$. Then, the data module $205_{B1}$ stores the data in the data storage unit $208_B$.

Figure 6A:
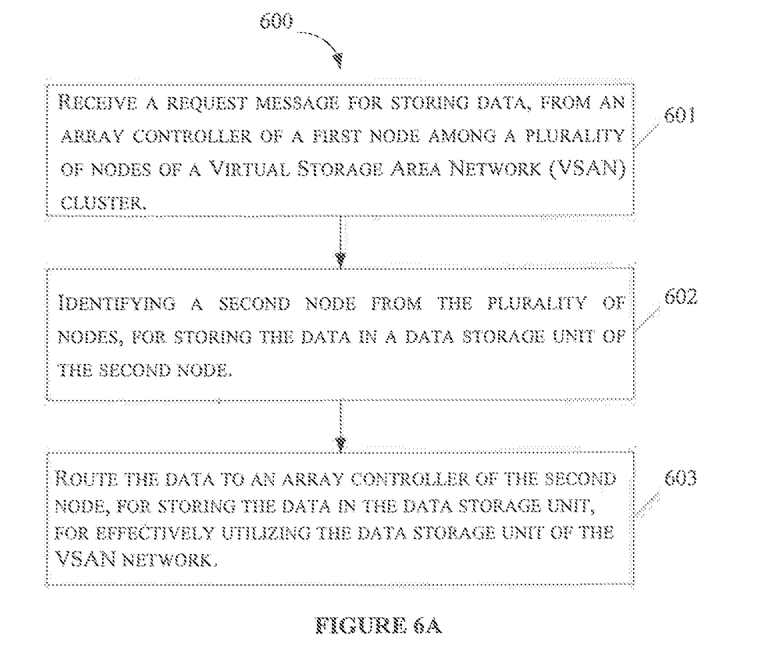
FIG. 6A and FIG. 6B show an exemplary flow chart illustrating a method for storing data in a data storage unit in accordance with some embodiments of the present disclosure.
Figure 6B:
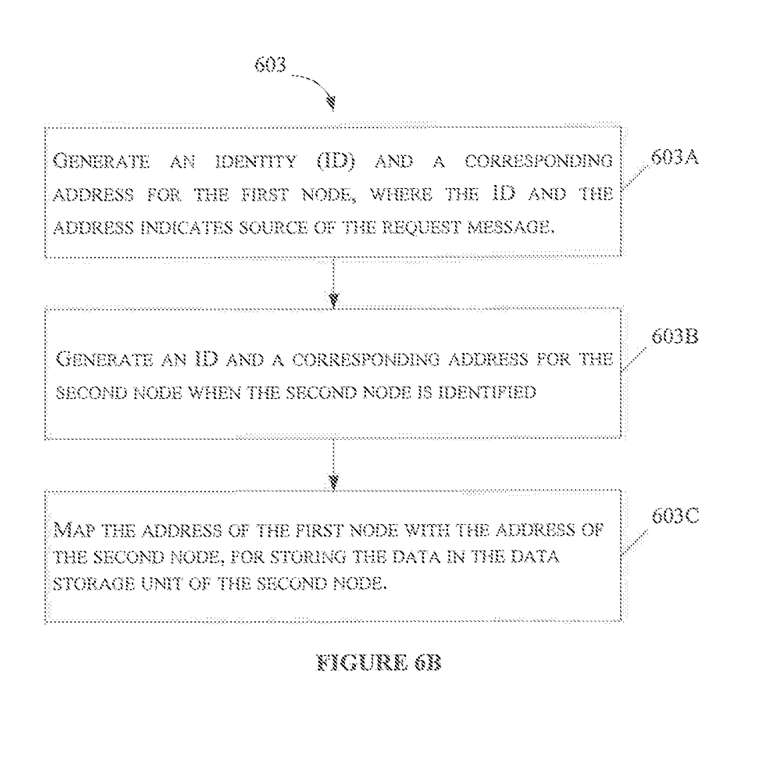

FIG. 6A and FIG. 6B show an exemplary flow chart illustrating a method for storing data in a data storage device of a VSAN 100.

As illustrated in FIG. 6A and FIG. 6B, the method 600 and 603 may comprise one or more steps for storing data in a data storage unit in accordance with some embodiments of the present disclosure. The method 600 and 603 may be described in the general context of computer executable instructions. Generally, computer executable instructions can include routines, programs, objects, components, data structures, procedures, modules, and functions, which perform particular functions or implement particular abstract data types.

The order in which the method 600 and 603 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 601, the receiving module 410 receives one or more I/O request messages from the first node $101_A$ of the VSAN 100. Here, the receiving module 410 receives the one or more I/O request messages when the available memory in the data storage unit $208_A$ is less than the predefined threshold memory. Further, the receiving module stores the data present in the one or more I/O request messages in the CRU 301.

At step 602, the node identification module 411 identifies the second node 101B from the plurality of nodes 101. In an embodiment, the node identification module 411 receives the data regarding available memory in data storage unit 208 from each of the plurality of nodes 101. The second node 101B is identified such that the available memory in the data storage unit $208_B$ is greater than the corresponding threshold memory. Also, the available memory can accommodate the size of the data.

At step 603, the routing module 414 routes the data to the second node 101B for storing the data in the data storage unit $208_B$. The step 603 can be further divided into 603A, 603B and 603C. FIG. 6B shows the method steps for routing the data to the second node 101B.

At step 603A, the generation module 412 generates an ID and address for the first node 101A. Here, the ID of the first node 101A indicates the cluster of the first node 101A, the array controller 201 used for processing the one or more I/O request messages and the routing module 203 used to route the one or more I/O request messages. Further, the address is generated based on the ID of the first node 101A. The address comprises one or more I/O request messages type and the array controller 201 which has processed the one or more I/O request messages.

At step 603B, the generation module 412 generates an ID and address for the second node 101B. Here, the ID of the second node 101B indicates the cluster of the second node 101B, the array controller 201 to be used for processing the one or more I/O request messages and the routing module 203 to be used to route the one or more I/O request messages for storing the data on the data storage unit $208_B$. Further, the address is generated based on the ID of the second node 101B. The address comprises one or more I/O request messages type and the array controller 201 which has to be used to process the one or more I/O request messages.

At step 603C, the mapping module 413 maps the address of the first node 101A with the address of the second node 101. The map generated provides a link between the first node 101A and the second node 101B. Thus, the link can be used to track the data which was intended to be stored in the first node 101A, but is stored in the second node 101B.

Referring back to step 603 of FIG. 6, the routing module 414 routes the one or more I/O request messages to the second module 101B for storing the data in the data storage unit 208K.

Computer System

Figure 7:
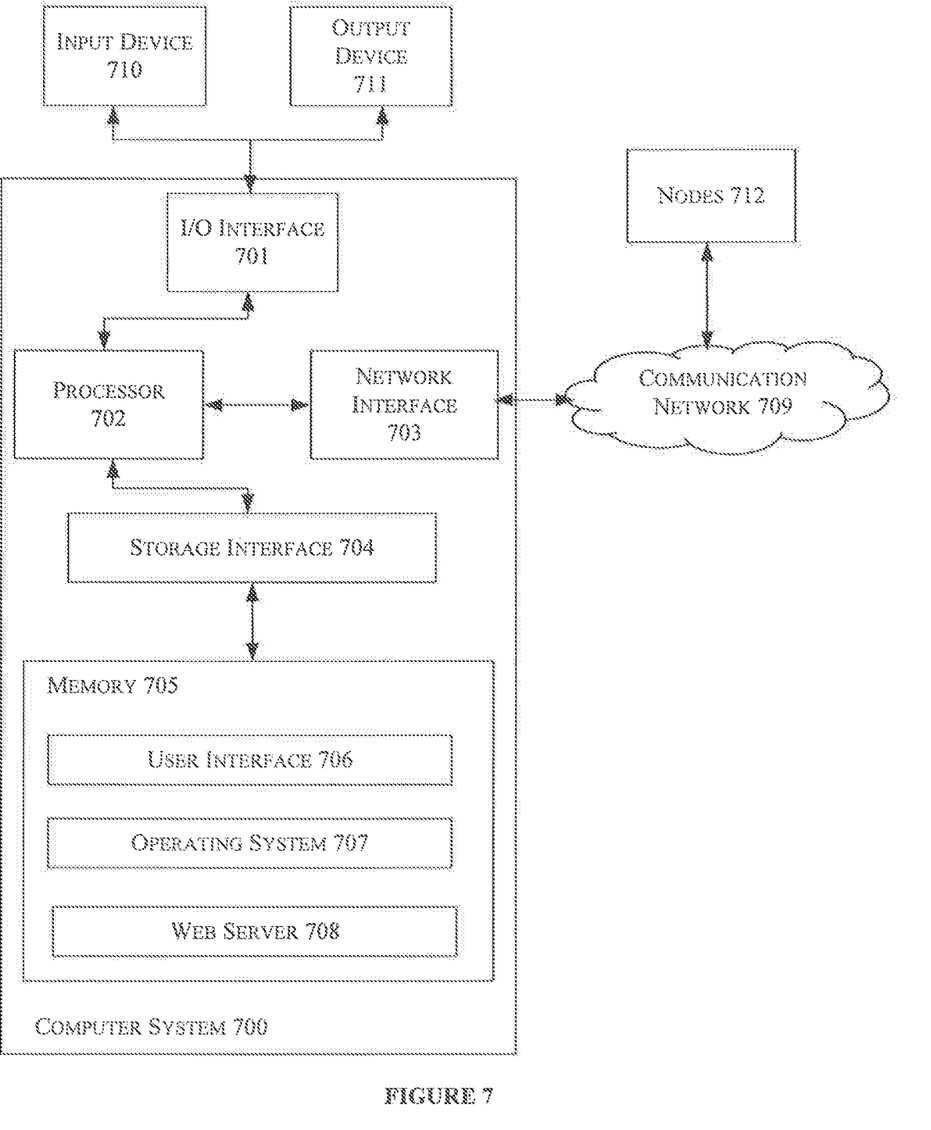
FIG. 7 shows a general-purpose computer system for storing data in a data storage unit in accordance with some embodiments of the present disclosure.

FIG. 7 illustrates a block diagram of an exemplary computer system 700 for implementing embodiments consistent with the present disclosure. In an embodiment, the computer system 700 is used to implement the method for storing data in a data storage unit 208 of a VSAN 100. The computer system 700 may comprise a central processing unit ("CPU" or "processor") 702. The processor 702 may comprise at least one data processor for executing program components for dynamic resource allocation at run time. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 711 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 is connected to the service operator through a communication network 709. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 709 may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface 703 and the communication network 709, the computer system 700 may communicate with the one or more service operators.

In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web server 708 etc. In some embodiments, computer system 700 may store user/application data 706, such as the data, variables, records, etc. as described in this disclosure. Such databases may be implemented as fault-tolerant, relational, scalable, secure databases such as Oracle or Sybase.

The operating system 707 may facilitate resource management and operation of the computer system 700. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, 10 etc.), Apple iOS, Google Android, Blackberry OS, or the like.

In some embodiments, the computer system 700 may implement a web browser 708 stored program component. The web browser 708 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX, DHTML, Adobe Flash, JavaScript, Java, Application Programming Interfaces (APIs), etc. In some embodiments, the computer system 700 may implement a mail server stored program component. The mail server may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 700 may implement a mail client stored program component. The mail client may be a mail viewing application, such as Apple Mail, Microsoft Entourage, Microsoft Outlook, Mozilla Thunderbird, etc.

In one embodiment, the computer system 700 is associated with plurality of nodes 712. Each of the plurality of nodes 712 provide the computer system 500 with data related to available memory in the corresponding data storage unit 208.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 6A and FIG. 6B, show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the present disclosure discloses a method and a system for distributing load to different data storage system units in a VSAN. Thus, processing efficiency of individual cluster increases.

In an embodiment, the cluster utilization is increased by storing data in data storage units of different nodes.

In an embodiment, the disclosed system and method is compatible with existing VSAN architecture. Hence, cost of implementing the disclosed system is low.

In an embodiment, the data can be stored in data storage unit of different cluster associated with the server management system, therefore the system managing memory efficiently in the VSAN.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
|---|---|
| 100 | VSAN |
| 101 | Node |
| 102 | Server management system |
| 103 | Switch |
| 104 | Host device |
| 201 | Array controllers |
| 202 | SCSI driver |
| 203 | Routing module |
| 204 | Control module |
| 205 | Data Module |
| 206 | Kernel |
| 207 | Processor cores |
| 208 | Data storage unit |
| 207 | Execution data |
| 208 | Other data |
| 301 | CRU |
| 302 | MRU |
| 303 | Kernel of Server management system |
| 304 | Processor cores of Server management system |
| 401 | I/O interface |
| 402 | Memory |
| 403 | Processor |
| 404 | Data |
| 405 | I/O request data |
| 406 | First node data |
| 407 | Second node data |
| 408 | Other data |
| 409 | Modules |
| 410 | Receiving module |
| 411 | Node identification module |
| 412 | Generation module |
| 413 | Mapping module |
| 414 | Routing module |
| 415 | Other modules |
| 700 | Computer system |
| 701 | I/O interface |
| 702 | Processor |
| 703 | Network interface |
| 704 | Storage interface |
| 705 | Memory |
| 706 | User Interface |
| 707 | Operating system |
| 708 | Web server |
| 709 | Communication network |
| 710 | Input devices |
| 711 | Output devices |
| 712 | Nodes |

We claim:

1. A method for storing data in a data storage unit of a Virtual Storage Area Network (VSAN), the method comprising:
receiving, by a server management system, a request message for storing data, from an array controller of a first node among a plurality of nodes of a Virtual Storage Area Network (VSAN) cluster, wherein each of the plurality of nodes comprises a pair of array controllers and a data storage unit;
identifying, by the server management system, a second node from the plurality of nodes, for storing the data in a data storage unit of the second node, when the available memory in the data storage unit of the first node is less than a predefined threshold memory corresponding to the data storage unit of the first node, wherein the available memory in the data storage unit of the second node is greater than a predefined threshold memory corresponding to the data storage unit of the second node and a size of the data, and wherein the predefined threshold memory corresponding to the data storage unit of the second node is a predefined percentage of a total memory of the data storage unit of the second node; and
routing, by the server management system, the data to an array controller of the second node, for storing the data in the data storage unit, for effectively utilizing the data storage units of the first node and the second node of the VSAN network, wherein routing the data to the array controller of the second node comprises:
generating a first ID and a source address for the first node, wherein the first ID and the source address indicates source of the request message;
generating a second ID and a destination address for the second node when the second node is identified, wherein the second ID indicates the VSAN cluster associated with the second node, the array controller used for processing the request message and a routing module used to route the data associated with the request message to the data storage unit, and wherein the destination address is generated based on the second ID; and
mapping the source address of the first node with the destination address of the second node, for storing the data in the data storage unit of the second node.

2. The method of claim 1, wherein the request message is received when the available memory in the data storage unit of the first node is less than the predefined threshold memory corresponding to the data storage unit of the first node.

3. The method of claim 1, wherein the first node receives the request message from a host device associated with the first node, for storing the data in the data storage unit of the first node.

4. The method of claim 1, wherein the available memory is greater than the size of the data.

5. A server management system for storing data in a data storage unit of a Virtual Storage Area Network (VSAN), the system comprising:
a processor; and
a memory, communicatively coupled to the processor, which stores processor executable instructions, which, on execution causes the processor to:
receive a request message for storing data, from an array controller of a first node among a plurality of nodes of a Virtual Storage Area Network (VSAN) cluster, wherein each of the plurality of nodes comprises a pair of array controllers and a data storage unit;
identify a second node from the plurality of nodes, for storing the data in a data storage unit of the second node, when the available memory in the data storage unit of the first node is less than a predefined threshold memory corresponding to the data storage unit of the first node, wherein the available memory in the data storage unit of the second node is greater than a predefined threshold memory corresponding to the data storage unit of the second node and a size of the data, and wherein the predefined threshold memory corresponding to the data storage unit of the second node is a predefined percentage of a total memory of the data storage unit of the second node; and
route the data to an array controller of the second node, for storing the data in the data storage unit, for effectively utilizing the data storage units of the first node and the second node of the VSAN network, wherein routing the data to the array controller of the second node comprises:

generating a first ID and a source address for the first node, wherein the first ID and the source address indicates source of the request message;

generating a second ID and a destination address for the second node when the second node is identified, wherein the second ID indicates the VSAN cluster associated with the second node, the array controller used for processing the request message and a routing module used to route the data associated with the request message to the data storage unit, and wherein the destination address is generated based on the second ID; and mapping the source address of the first node with the destination address of the second node, for storing the data in the data storage unit of the second node.

6. The server management system of claim 5, wherein the request message is received when the available memory in the data storage unit of the first node is less than the predefined threshold memory corresponding to the data storage unit of the first node.

7. The server management system of claim 5, wherein the first node receives the request message from a host device associated with the first node, for storing the data in the data storage unit of the first node.

8. The server management system of claim 5, wherein the available memory is greater than the size of the data.

9. A non-transitory computer-readable medium storing a set of computer-executable instructions for storing data in a data storage unit of a Virtual Storage Area Network (VSAN), wherein upon execution of the instructions by one or more processors, the one or more processors perform operations comprising:

receiving a request message for storing data, from an array controller of a first node among a plurality of nodes of a Virtual Storage Area Network (VSAN) cluster, wherein each of the plurality of nodes comprises a pair of array controllers and a data storage unit;

identifying a second node from the plurality of nodes, for storing the data in a data storage unit of the second node, when the available memory in the data storage unit of the first node is less than a predefined threshold memory corresponding to the data storage unit of the first node, wherein the available memory in the data storage unit of the second node is greater than a predefined threshold memory corresponding to the data storage unit of the second node and a size of the data, and wherein the predefined threshold memory corresponding to the data storage unit of the second node is a predefined percentage of a total memory of the data storage unit of the second node; and routing the data to an array controller of the second node, for storing the data in the data storage unit, for effectively utilizing the data storage units of the first node and the second node of the VSAN network, wherein routing the data to the array controller of the second node comprises:

generating a first ID and a source address for the first node, wherein the first ID and the source address indicates source of the request message;

generating a second ID and a destination address for the second node when the second node is identified, wherein the second ID indicates the VSAN cluster associated with the second node, the array controller used for processing the request message and a routing module used to route the data associated with the request message to the data storage unit, and wherein the destination address is generated based on the second ID; and mapping the source address of the first node with the destination address of the second node, for storing the data in the data storage unit of the second node.

10. The medium of claim 9, wherein the request message is received when the available memory in the data storage unit of the first node is less than the predefined threshold memory corresponding to the data storage unit of the first node.

11. The medium of claim 9, wherein the first node receives the request message from a host device associated with the first node, for storing the data in the data storage unit of the first node.

12. The medium of claim 9, wherein the available memory is greater than the size of the data.

* * * * *